(12) United States Patent
Callahan et al.

(10) Patent No.: US 7,311,088 B1
(45) Date of Patent: Dec. 25, 2007

(54) PASSIVE EVAPORATIVE EMISSION CONTROL MODULE

(75) Inventors: Douglas John Callahan, Rochester Hills, MI (US); Brent J. Ertl, Darien, WI (US); Juris J. Pruzinskis, Janesville, WI (US); Michael P. Farrey, Walworth, WI (US); Hans Bishop, Royal Oak, MI (US)

(73) Assignee: Miniature Precision Components, Inc., Walworth, WI (US)

( * ) Notice: Subject to any disclaimer, the term of this patent is extended or adjusted under 35 U.S.C. 154(b) by 0 days.

(21) Appl. No.: 11/419,584

(22) Filed: May 22, 2006

(51) Int. Cl.
*F02M 33/02* (2006.01)

(52) U.S. Cl. ............ 123/519; 123/516; 123/518; 123/520; 95/146; 96/139

(58) Field of Classification Search ............ 123/514, 123/519, 527, 516, 518, 520; 96/139; 95/146, 95/148
See application file for complete search history.

(56) References Cited

U.S. PATENT DOCUMENTS

| | | | | |
|---|---|---|---|---|
| 3,372,679 | A | * | 3/1968 | Aitken .................. 123/519 |
| 3,748,829 | A | * | 7/1973 | Joyce et al. ............. 95/146 |
| 4,028,075 | A | * | 6/1977 | Roberge ................ 96/139 |
| 4,572,394 | A | * | 2/1986 | Tanahashi et al. ........ 220/86.2 |
| 4,701,198 | A | * | 10/1987 | Uranishi et al. ............ 96/148 |
| 4,703,737 | A | | 11/1987 | Cook et al. |
| 4,747,508 | A | | 5/1988 | Sherwood |
| 4,798,306 | A | | 1/1989 | Giacomazzi et al. |
| 4,919,103 | A | * | 4/1990 | Ishiguro et al. ........... 123/514 |
| 4,926,914 | A | | 5/1990 | Morizumi et al. |
| 5,054,453 | A | | 10/1991 | Onufer |
| 5,165,379 | A | | 11/1992 | Thompson |
| 5,186,221 | A | * | 2/1993 | Ellis ..................... 141/59 |
| 5,259,412 | A | | 11/1993 | Scott et al. |
| 5,644,072 | A | | 7/1997 | Chirco et al. |
| 5,647,332 | A | | 7/1997 | Hyodo et al. |
| 5,819,796 | A | | 10/1998 | Kunimitsu et al. |
| 5,868,119 | A | | 2/1999 | Endo et al. |
| 6,029,719 | A | * | 2/2000 | Hor et al. ............... 141/348 |
| 6,213,170 | B1 | | 4/2001 | Burke et al. |
| 6,311,741 | B1 | | 11/2001 | Harrigan, Sr. et al. |
| 6,364,145 | B1 | | 4/2002 | Shaw et al. |
| 6,378,505 | B1 | | 4/2002 | Doering et al. |
| 6,390,074 | B1 | | 5/2002 | Rothamel et al. |
| 6,497,335 | B2 | | 12/2002 | Low et al. |
| 6,502,559 | B2 | | 1/2003 | Katayama et al. |
| 6,557,533 | B2 | | 5/2003 | Katayama et al. |
| 6,581,580 | B2 | | 6/2003 | Trumpy et al. |
| 6,655,403 | B2 | | 12/2003 | Mills |
| 6,681,789 | B1 | | 1/2004 | Moulis et al. |
| 6,685,045 | B1 | | 2/2004 | Palvolgyi |
| 6,810,862 | B2 | | 11/2004 | Bergsma |

(Continued)

*Primary Examiner*—Stephen K. Cronin
*Assistant Examiner*—J. Page Huffy
(74) *Attorney, Agent, or Firm*—Dickinson Wright PLLC

(57) ABSTRACT

An emission control module (14) includes a housing (52) that includes an atmospheric air opening (102) and a vapor emission inlet (104) for communication with a vapor region (32) of a fuel reservoir (16). A hydrocarbon filter (56) is disposed between the atmospheric air opening (102) and the vapor emission inlet (104) to passively filter vapor emissions within the vapor region (32). The housing (52) is configured for purging of the hydrocarbon filter (56) due to a low-pressure draw from the vapor emission inlet (104).

17 Claims, 4 Drawing Sheets

U.S. PATENT DOCUMENTS

| | | |
|---|---|---|
| 6,874,484 B2 | 4/2005 | Benjey |
| 7,007,726 B1 | 3/2006 | Martin et al. |
| 7,086,390 B2 * | 8/2006 | Shears et al. ............... 123/518 |
| 7,143,750 B2 * | 12/2006 | Brunel et al. ................ 123/509 |
| 2005/0274364 A1 * | 12/2005 | Kirk et al. ................... 123/519 |
| 2006/0016436 A1 | 1/2006 | Groom et al. |

* cited by examiner

PASSIVE EVAPORATIVE EMISSION CONTROL MODULE

TECHNICAL FIELD

The present invention relates to fuel tanks and to evaporative emission devices, circuits, and systems. More particularly, the present invention is related to a technique for passively controlling the amount of evaporative emissions emitted to the atmosphere from a fuel reservoir or the like.

BACKGROUND OF THE INVENTION

Internal combustion engines typically receive fuel that is contained within a fuel tank. An air space or vapor region exists, generally above the surface of the fuel, within the tank. The vapor region is composed of fuel evaporative emissions that can be under pressure. It is desired that the amount of such evaporative emissions contained within the tank be minimized for multiple reasons. One primary reason for such reduction is to minimize emissions of hydrocarbons into the atmosphere, and thus to minimize pollution of the atmosphere.

A fuel tank assembly generally consists of a fuel reservoir, which has a fuel cap and may have a fuel neck therebetween. The fuel neck when incorporated is integrally formed as a single unit with the fuel reservoir. When the level of the fuel in the fuel reservoir is low, the vapor region contains a large amount of fuel vapor under pressure. Consequently, when the fuel cap is detached from the fuel inlet of the fuel reservoir, fuel vapor is forced out of the fuel reservoir into the outside air, causing air pollution. In addition, when fuel is fed into the fuel reservoir from a fuel pump nozzle, the fuel spouted from the nozzle comes into violent contact with and agitates the fuel in the fuel reservoir. This causes bubbles to form in the fuel contained in the fuel reservoir. The collapsing of these bubbles causes further amounts of fuel vapor to be generated in the fuel reservoir, and this fuel vapor flows out from the fuel inlet, causing more air pollution.

Some vehicle fuel systems include valves that are associated with a fuel tank and are configured to vent pressurized or displaced fuel vapor from the vapor region to a separate vapor recovery canister. The canister is designed to capture and store the hydrocarbons entrained in the fuel vapors. Other similar fuel systems include a vapor recovery canister that is attached to a fuel tank. These systems tend to be complex in design, and require an active purging of the vapor recovery canisters. The active purging may be as a result of drawing air through the canister and into an intake manifold as part of an air intake process or through the use of a separate purging circuit.

Another technique that is used to reduce evaporative emission includes a fuel tank cap that is configured with a vapor recovery canister. A purge line extends from the fuel cap to an intake manifold. To purge the canister air is drawn through the canister and into the intake manifold. Not only is this an active system, but it also is limited in its ability to minimize vapor emissions, due to application feasible size constraints of the fuel cap. Also, the fuel cap can be bulky and difficult or awkward to remove and replace from the fuel tank, as a result of the attached purge line.

One known passive technique of venting or balancing the pressure within a fuel tank consists of a fuel cap that has inlet and outlet vents. Although the fuel cap may be appropriately sized, the fuel cap is incapable of minimizing fuel vapor emissions into the atmosphere.

It is desired to limit daily hydrocarbon evaporative emissions from small off-road displacement engines, such as lawn mowers, all-terrain vehicles, go-karts, trimmers, leaf blowers, generators, power washers, and snow blowers. This may be achieved by capturing and directing emitted hydrocarbons, associated with the fuel tanks of each engine, to combustion chambers for combustion thereof.

Thus, there is a need for an improved technique of controlling the amount of evaporative emissions that escape to the atmosphere that overcomes the above-stated and other disadvantages and limitations associated with prior devices and systems.

SUMMARY OF THE INVENTION

One embodiment of the present invention includes an emission control module. The module has a housing with an atmospheric air opening and a vapor emission inlet for communication with a vapor region of a fuel reservoir. A hydrocarbon filter is disposed between the atmospheric air opening and the vapor emission inlet to passively filter vapor emissions within the vapor region. The housing is configured for purging of the hydrocarbon filter due to a low-pressure draw from the vapor emission inlet.

The embodiments of the present invention provide several advantages. One such advantage is an evaporative emission control module that is simple in design and has a passive purge mechanism. The passive purge mechanism provides for purging of a hydrocarbon filter without the draw of airflow from an intake manifold or the systematic introduction of airflow into a purge canister.

Another advantage that is provided by an embodiment of the present invention is an evaporative emission control module that is directly attached to a fuel tank without the need for purge tanks, purge lines, or other fuel tank external devices.

Yet another advantage provided by the embodiments of the present invention is an evaporative emission control module that is integrally formed as part of or attached to a fuel tank and not part of a fuel cap. As such, the present invention provides increased design flexibility and an increased number of applications by which the present invention may be used.

Furthermore, the present invention provides an evaporative emission control module that has a fuel splash absorber, which prevents soaking of a hydrocarbon filter.

The present invention itself, together with further objects and attendant advantages, will be best understood by reference to the following detailed description, taken in conjunction with the accompanying drawings.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
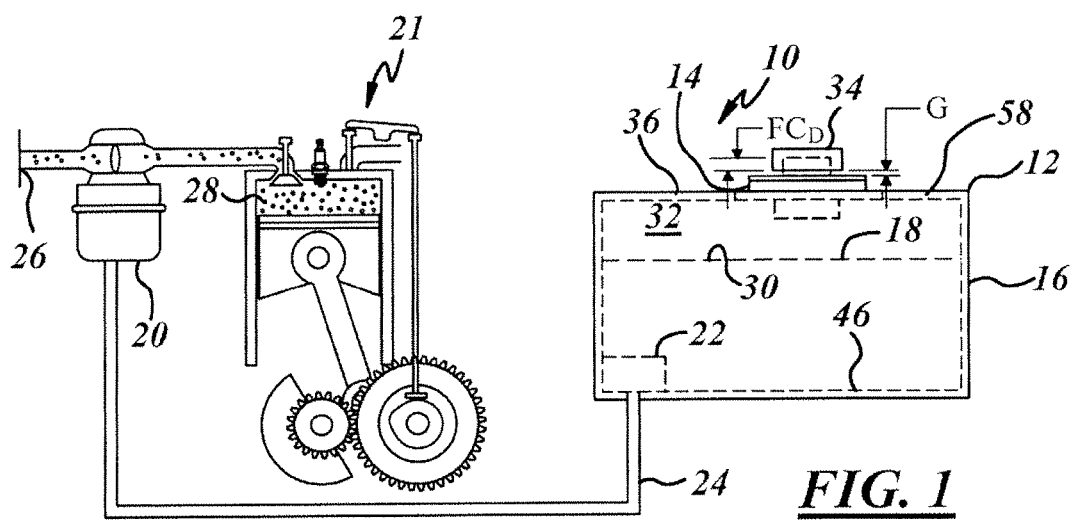
FIG. 1 is a side view of a fuel supply system that has a fuel tank assembly with a passive evaporative emission control module in accordance with an embodiment of the present invention.

In the following figures, the same reference numerals will be used to refer to the same components. While the present invention is described primarily with respect to a passive evaporative emission control module for use in small displacement combustion engine applications, the present invention may be applied in and to various applications. The present invention may be applied to small displacement engine applications, such as to lawn mower applications, all-terrain vehicle applications, go-kart applications, trimmer applications, leaf blower applications, generators, power washers, chainsaw applications, snow blower applications, snow mobile applications, individual watercraft applications, and to various other small displacement engine applications known in the art. The present invention may also be applied to large displacement engine applications. The present invention may be utilized in association with various vehicle and non-vehicle applications. The present invention may apply to automotive, aeronautical, nautical, railway commercial, and non-commercial industries, as well as to other industries that utilize a fuel tank having a vapor region.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Referring now to FIG. 1, a side view of a fuel supply system 10 that has a fuel tank assembly 12 with a passive evaporative emission control module 14 for a fuel tank or reservoir 16 in accordance with an embodiment of the present invention is shown. The fuel tank assembly 12 is in communication with and is used to supply a fuel 18 to a carburetor 20 of an engine 21. A fuel pump 22 may be incorporated for operational passage of the fuel 18 between the fuel reservoir 16 and the carburetor 20. During operation of the engine 21, fuel is drawn or pumped from the fuel reservoir 16 to the carburetor 20 via a fuel supply line 24. The fuel 18 is mixed with air received from an air intake 26 and passed from the carburetor 20 to a combustion chamber 28. The control module 14 is used to filter evaporative emissions contained within the fuel reservoir 16 above the surface 30 of the fuel 18 in a vapor region 32. The control module 14 provides such filtering without systematic intervention.

The fuel tank assembly 12 includes the control module 14, as well as the fuel reservoir 16 and the fuel cap 34. Although not shown in FIG. 1, the fuel tank assembly 12 may also include a fuel neck, examples of such are shown and described with respect to FIGS. 8-9.

Figure 2:
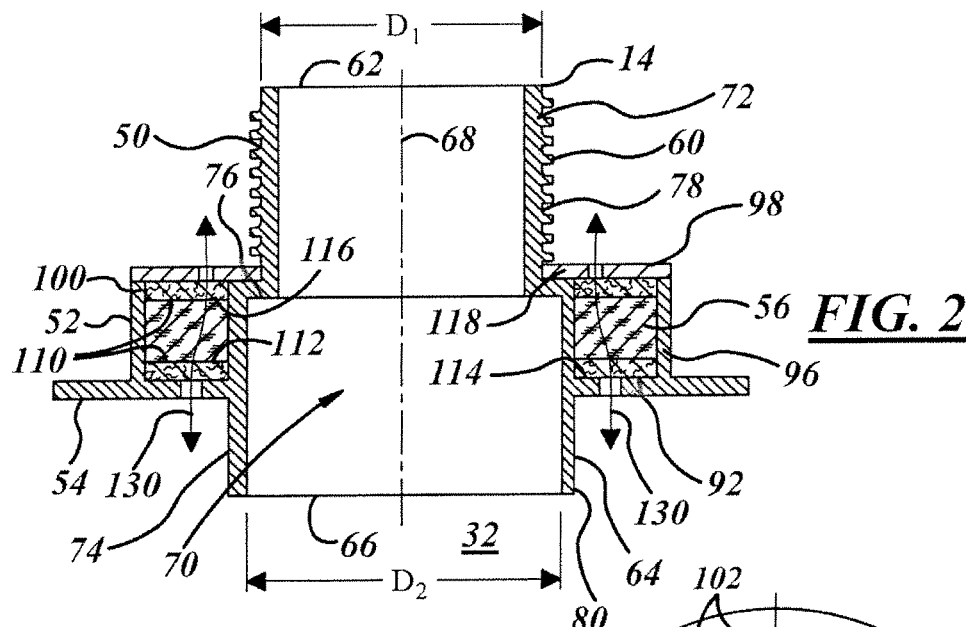
FIG. 2 is a close-up cross-sectional side view of the emission control module of FIG. 1.
Figure 3:
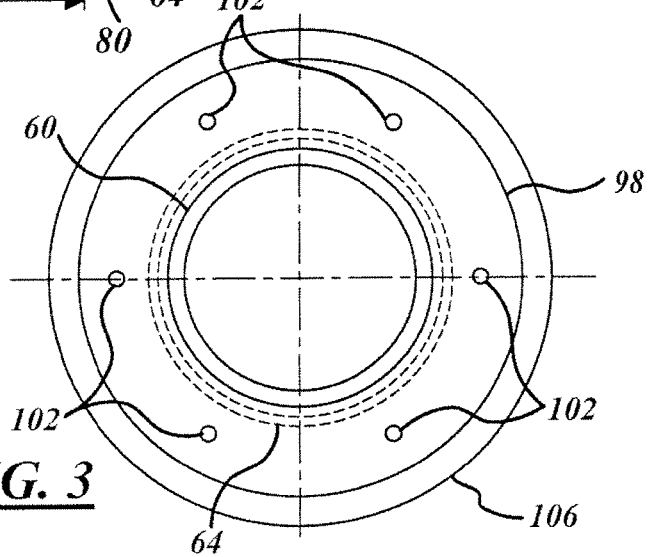
FIG. 3 is a top view of an annular ring for a housing of the emission control module of FIG. 1.
Figure 4:
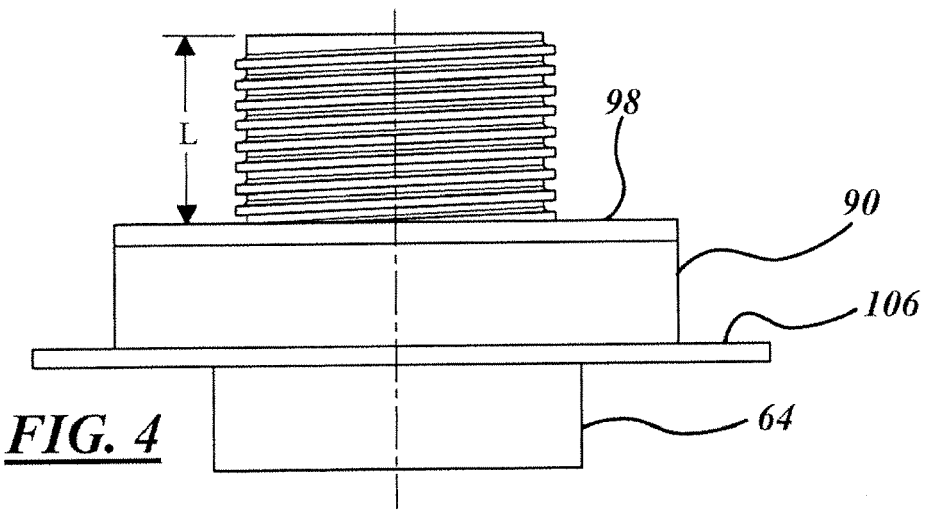
FIG. 4 is a close-up side view of the emission control module of FIG. 1.
Figure 5:
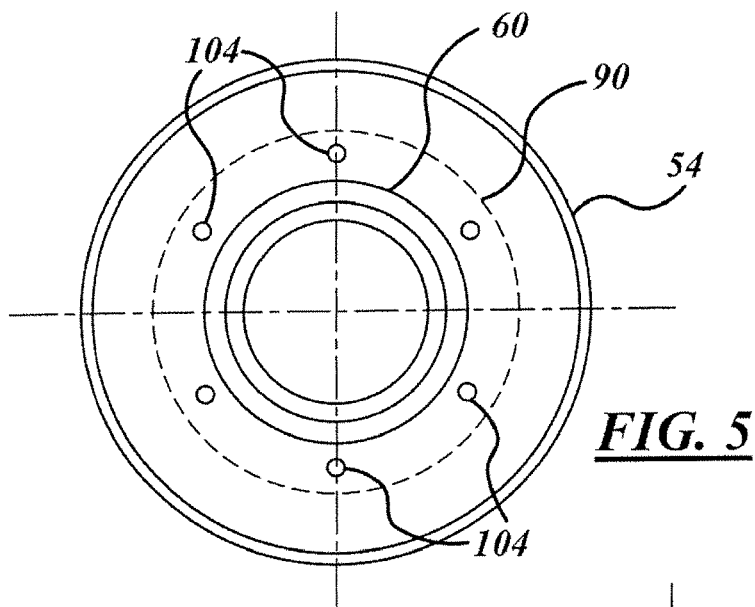
FIG. 5 is a bottom view of the emission control module of FIG. 1.
Figure 6:
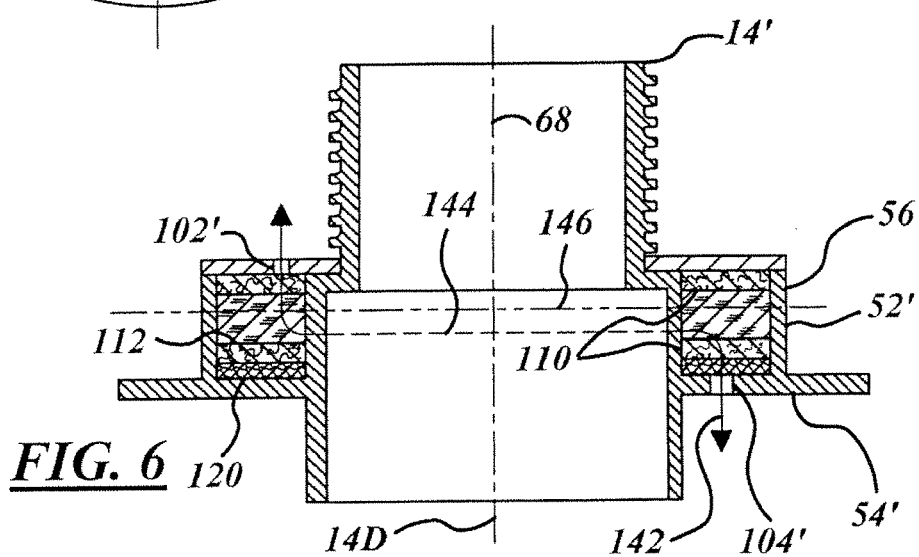
FIG. 6 is a side view of another passive evaporative emission control module incorporating a fuel splash absorber and illustrating a hydrocarbon filter purge path in accordance with other embodiments of the present invention.

The control module 14 is mounted on the top 36 of or proximate the highest elevation point on the fuel reservoir 16 to assure that evaporative emissions within the vapor region 32 enter a hydrocarbon filter 56 contained therein. The hydrocarbon filter 56 is best seen in FIGS. 2 and 6. Of course, the control module 14 may be coupled to the fuel reservoir 16 in various other locations. The control module 14 is attached to or integrally formed as part of the fuel reservoir 16. The control module 14 may be formed with the fuel reservoir 16 as a single unit.

Although a fuel pump 22 is shown, the fuel reservoir 16 may be located at a level such that fuel 18 passes to the carburetor 20 via gravity, as opposed to being pumped. The fuel 18 may also be drawn to the carburetor 20 due to pressure differences therebetween. The fuel pump 22, as shown, is located in and at the bottom 46 of the fuel reservoir 16. This is one example location; the fuel pump 22 may be located external to the fuel reservoir 16 or anywhere else in the fuel reservoir 16. Also, the carburetor 20 may be replaced with a fuel injection system (not shown).

Referring now also to FIGS. 2-5, in which a close-up cross-sectional side view, a top view, a close-up side view, and a bottom view of the control module 14 are shown. The control module 14 includes a body 50 and a housing 52 that has a base 54. The body 50 and the housing 52 or portions thereof may be integrally formed as a single unit or may be formed of multiple units. Likewise, the body 50, the housing 52, or a portion thereof may be integrally formed as a single unit with the fuel reservoir 16. In the embodiment shown, the base 54 is attached to and integrally formed as part of the exterior wall 58 of the fuel reservoir 16. The body 50 or the housing 52 may be coupled to the exterior wall 58 via one or more known techniques, such as welding, fastening, molding, sealing, and adhering. In one embodiment of the present invention, the fuel reservoir 16, the body 50, and the housing 52 are formed using a blow-molding process. A welding technique is further described below with respect to FIG. 7.

The control module 14 may be formed of similar materials as the fuel reservoir 16. The control module 14 and the fuel reservoir 16 may be formed of various materials, such as steel, aluminum, plastic, metallic or non-metallic materials, composite materials, high-density polyethylene (HDPE), acetal, or any other suitable material or combination thereof. The control module 14 and the fuel reservoir 16 are formed of materials to prevent hydrocarbon permeation to the atmosphere. The control module 14 and the fuel reservoir 16 may have one or more layers or coatings (multiple layers are not shown and coatings are not shown).

The body 50 is in the form of a fuel pass-through coupling and allows fuel to be directed through the control module 14 unaffected and to the fuel reservoir 16. The housing 52 contains a hydrocarbon filter 56 or the like for the filtering of evaporative emissions within the vapor region 32. The body 50 and the housing 52 are attached to the fuel reservoir 16 via the base 54. The body 50 is configured for reception of the fuel cap 34.

The body 50 has a first half or inlet half 60 with a fuel inlet 62 and a second half or outlet half 64 with a fuel outlet 66. The halves 60 and 64 are cylindrical in shape and share the same center fuel flow axis 68, which extends longitudinally through the center 70 of the control module 14. The inlet half 60 is positioned over and has a smaller outer diameter than the inner diameter of the outlet half 64. The inlet half outer diameter is designated by $D_1$ and the outlet half inner diameter is designated by $D_2$. The inlet half 60 has a first cylindrical outer wall 72 that is offset from the second cylindrical outer wall 74 of the outlet half 64. The outer walls 72 and 74 are attached via a center annular ring 76. Although the body 50 is shown as a single unitary structure, the body 50 may be formed of multiple segments, which may include the inlet half 60, the outlet half 64, and the center ring 76. Also, the control module 14, including the body 50, the housing 52, and the components thereof, may take on a variety of shapes and styles. The cylindrical and annular shaped-components of the control module 14, as shown herein, are provided for example purposes only; the components may be of other shapes and styles, have other associated arrangements and configurations, and have other associated relative relationships.

The inlet half 60 is configured for reception of the fuel cap 34 on an exterior side 78 thereof. The exterior side 78, as shown, is threaded. One skilled in the art would readily envision that the inlet half 60 may have other fuel cap attachment configurations. A variety of other techniques for coupling to a fuel cap, not described herein for simplicity, are known and may be utilized. However, the position and configuration relationship between the fuel cap 34, when fastened to the inlet half 60, and the housing 52 are first disclosed herein and are described in further detail below.

Figure 7:
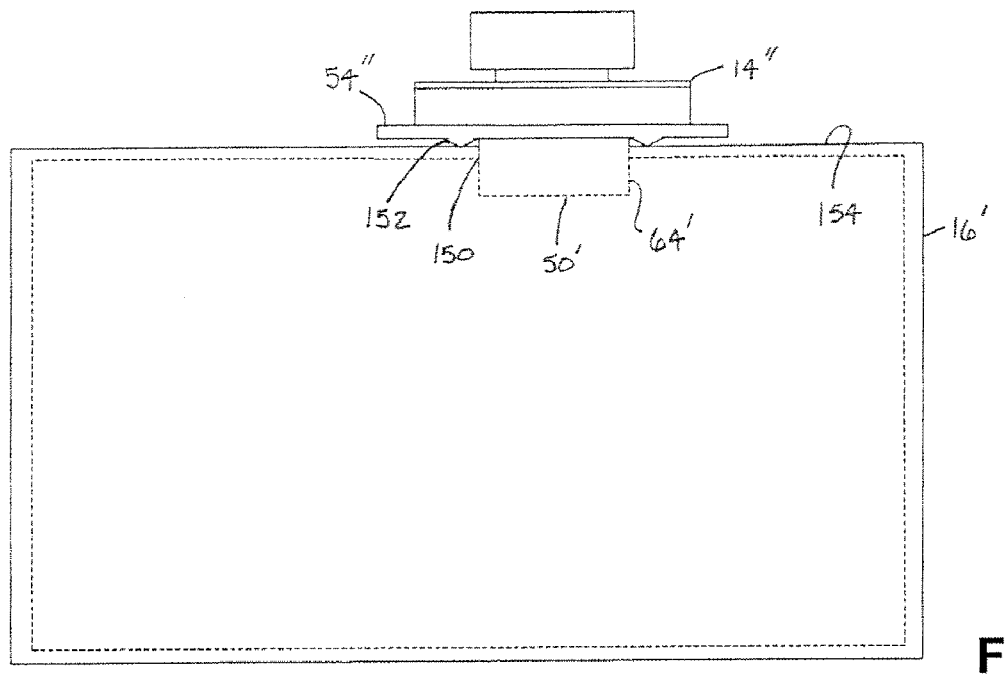
FIG. 7 is a side view of another passive evaporative emission control module prior to attachment thereof to a fuel tank and in accordance with another embodiment of the present invention.
Figure 8:
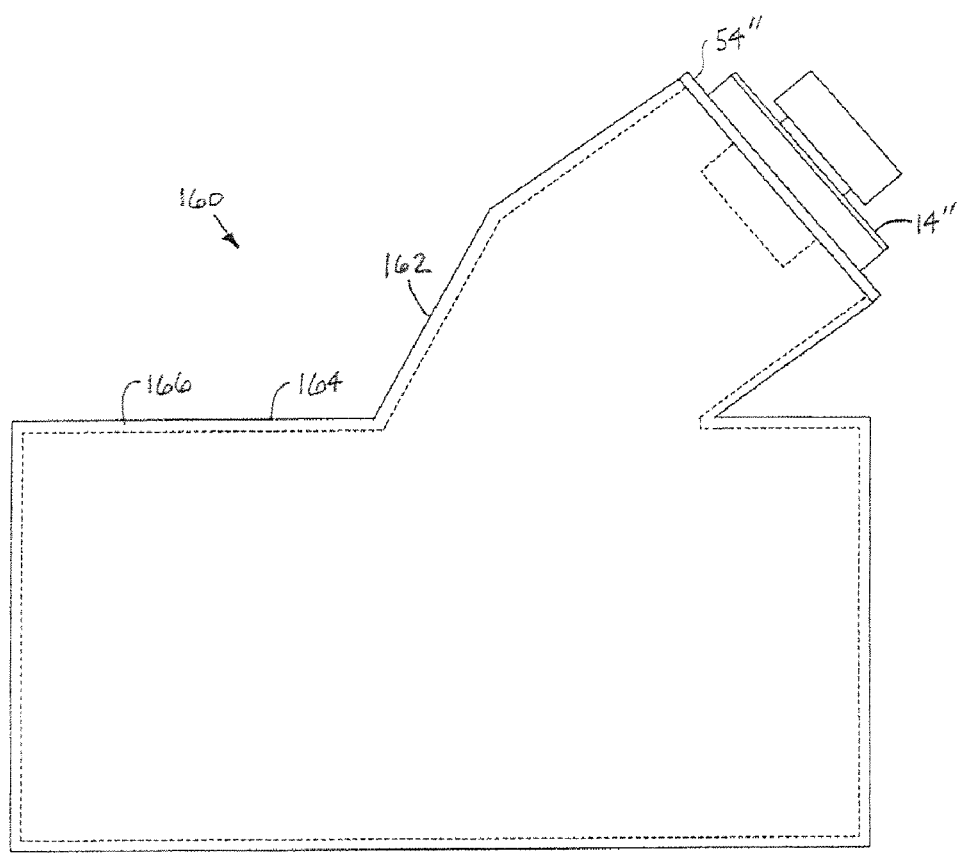
FIG. 8 is a side view of another passive evaporative emission control module attached to a fuel neck of a fuel tank and in accordance with another embodiment of the present invention.
Figure 9:
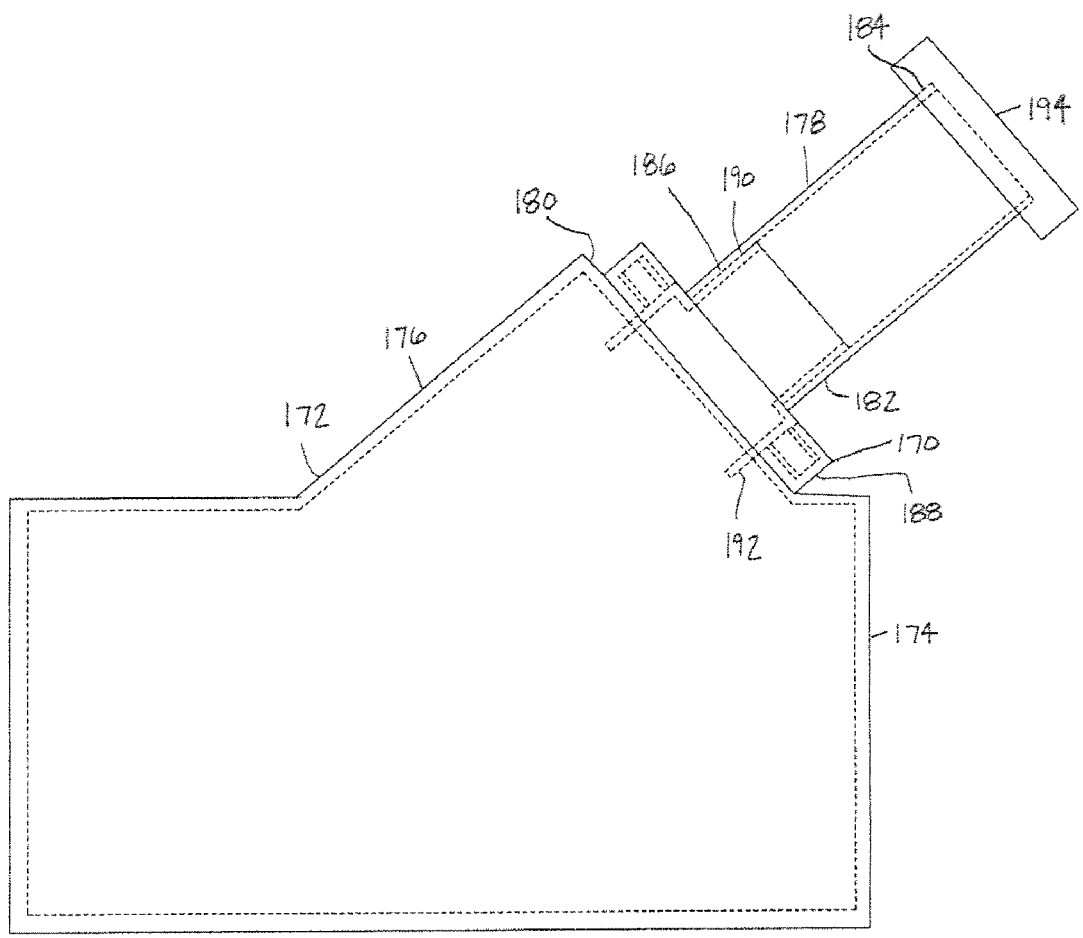
FIG. 9 is a side view of another passive evaporative emission control module incorporated as part of a fuel neck of a fuel tank and in accordance with yet another embodiment of the present invention.

The housing 52 is annular-shaped and is coupled to the circumferential periphery 80 of the body 50 on the outlet half 64 near and in contact with the inlet half 60. This coupling between the housing 52 and the body 50 allows the outlet half 64 to extend within the fuel reservoir 16. Although the housing 52 is shown as being attached to and integrally formed as part of the exterior wall 58, the housing 52 may be attached to a fuel tank or be attached to or integrally formed as part of a fuel reservoir neck, as shown in FIGS. 7-9. The housing 52 is not in communication with the body 50, but rather is attached thereto to form a single module, which may be incorporated into a fuel tank assembly 12 using an abundant number of techniques, several of which are described herein.

The housing 52 includes annular main portion 90 with an annular channel 92 therein. The main portion 90 includes the base 54 and a sidewall 96 that extends approximately parallel to the outlet half 64. An annular top plate or cover 98 slides over the inlet half 60 and rests and is attached to the cover end 100 of the sidewall 96 and the center ring 76. The cover 98 encloses the channel 92. The cover 98 has one or more atmospheric air openings 102, six are shown, which are in communication with external or atmospheric air. The air openings 102 are not in communication with or coupled to an intake manifold, and are thus considered non-intake manifold coupling elements.

The base 54 has one or more vapor emission inlets 104, six are shown, which are in communication with or exposed to the vapor region 32. The base 54 has an annular outward extending flange 106. The flange 106 may be used for coupling control module 14 to the fuel reservoir 16, as shown, or to a fuel neck.

The housing 52 is in the form of a canister and contains the hydrocarbon filter 56. Vapors within the fuel reservoir 16 or the vapor region 32 enter through the vapor emission inlets 104 and resultant filtered air within the housing 52, having a minimal, low, negligible, or zero hydrocarbon concentration level, is permitted to escape or pass through the air openings 102 to the atmosphere. The hydrocarbon filter 56 may consist of a charcoal bed, activated charcoal pellets, or other suitable hydrocarbon capturing materials known in the art.

The amount of hydrocarbon filtering depends upon the size of the hydrocarbon filter used, the type of material used within the filter, the configuration of the filter, the size and shape of the fuel tank, the engine operating conditions, the internal wall surface area of the fuel tank, the location of the fuel tank to heat sources, the temperature conditions experienced by the fuel tank, the efficiency absorption of the filter and flow path, and other parameters known in the art. The size of the housing 52 and the hydrocarbon filter 56 may vary depending upon the application, the size or volume of the fuel tank, the displacement of the associated engine, or the federal, state, or city regulation requirements governing hydrocarbon emissions and related filtering. Some of the stated requirements may be addressed via an environmental protection agency.

Although the air openings 102, as shown, are in-line with the fuel cap 34, the body 50 and the housing 52 are configured such that the fuel cap 34 when fully fastened to the body 50 do not close off the air openings 102. The inlet half 60 has a length L that is longer than the depth FCD of the fuel cap 34. When fully fastened, a separation distance or gap G exists between the fuel cap 34 and the cover 98 or an exterior surface of the housing 50. The gap G permits air to flow into and out of the air openings 102.

A pair of ring-shaped retaining elements 110 also is disposed within the housing 52. A first retaining element 112 is attached to or set into place on the base 54 or the bottom 114 of the channel 92 and a second retaining element 116 is attached to or set into place on the inner side 118 of the cover 98. The retaining elements 110 are incorporated to retain the hydrocarbon capturing material of the filter 56 disposed therebetween. The retaining elements 110 are configured or formed of materials, which prevent the hydrocarbon capturing material from migrating or escaping from the housing 52 through either the air openings 102 or the vapor emission inlets 104. The retaining element materials are also such to allow the passage of air and vapors therethrough. The retaining elements 110 may be formed of non-woven polyester, cotton, pressed cotton, or other known or suitable materials. The retaining elements 110 may be of various shapes, styles, types, and sizes.

The housing 52 and the above-described components thereof provide a purge mechanism that allows for the passive purging of the hydrocarbon filter 56. When the engine 21 is disabled or when the engine 21 is not drawing fuel from the fuel reservoir 16, hydrocarbon emissions form within the vapor region 32 and migrate into the housing 52. The emissions are collected in the hydrocarbon filter 56. To prevent saturation of the hydrocarbon filter 56, the purge mechanism provides for the flushing out of the filter 56 via the draw of air therethrough. When fuel is being pumped or drawn out of the fuel reservoir 16, pressure within the fuel reservoir 16 decreases, thereby pulling air in the air openings 102, across the hydrocarbon filter 56, and through the vapor emission inlets 104 into the fuel reservoir 16. Once reentering the fuel reservoir 16 the hydrocarbon emissions reenter the fuel 18 and may be directed to and through the fuel supply line 24.

Also, as temperatures increase in the fuel reservoir 16, fuel vapors increase, which increases pressure within the fuel reservoir 16 causing the fuel vapors to enter the filter 56. When temperatures decrease, the pressure within the fuel reservoir decreases creating a vacuum, which cause are to be drawn into and thus purges the filter 56. This can occur from environment temperature changes without activation or deactivation of a corresponding engine.

Referring now to FIGS. 2 and 6, in FIG. 6 a side view of another passive evaporative emission control module 14' incorporating a fuel splash absorber 120 and illustrating a hydrocarbon filter purge path in accordance with other embodiments of the present invention is shown. The fuel-absorbing element 120 is disposed between the base 54' and the first retaining element 112. The fuel-absorbing element 120 is used to prevent fuel from entering the housing 52' and contaminating the hydrocarbon filter 56 and/or the retaining elements 110. Due to fuel shifting or splashing around within an associated fuel tank, the fuel may enter the housing 52' through the vapor emission inlets 104' (only one is shown). The fuel splash absorber 120 soaks up the fuel that enters the housing 52'. Since the amount of fuel that enters the housing 52' is minimal, fuel within the fuel splash absorber 120 evaporates overtime and enters the hydrocarbon filter 56. The fuel splash absorber 120 is also formed of material(s) that allow vapor emissions and air to pass therethrough. The fuel splash absorber 120 may, for example, be formed of an open cell foam rubber or other suitable material. The fuel splash absorber 120 may also be of various shapes, styles, types, and sizes, and have various associated absorbencies.

In the embodiment of FIG. 2, the air inlets 102 and the vapor emission inlets 104 are in alignment. As vapors enter the vapor emission inlets 104, they are directly passed, following approximately semi-linear to linear paths that are parallel to the center fuel flow axis 68, through the hydrocarbon filter 56 and the resultant filtered air is passed out the air openings 102. The same direct flow paths are followed, but in reverse, for the purging of the hydrocarbon filter 56 via the drawing of air through the housing 52 and into the fuel reservoir 16. The direct flow paths are designated by lines 130.

To increase the utilization and filtering characteristics over that provided by the control module 14, the control module 14' provides an offset configuration between the air openings 102' and the vapor emission inlets 104'.

The control module 14' is similar to the control module 14, however, the air openings 102' are on the opposite side of a longitudinal center plane 140, passing through the longitudinal fuel flow axis 68, as compared to the vapor emission inlets 104'. As such, the air openings 102' are out of alignment with the vapor emission inlets 104'. Consequently, the non-linear air flow or hydrocarbon filter purge paths 142 (only one is shown) incorporate path segments 144 (only one is shown) that are approximately perpendicular to the center fuel flow axis 68 such that air or vapors are directed across a significant portion of the hydrocarbon filter 56. The path segments 114 are parallel to a lateral plane 146, which is perpendicular to the center plane 140.

During fuel consumption, air is drawn through the air openings 102', passed radially across the hydrocarbon filter 56, and through the vapor emission inlets 104'. During the purging process, vapors are passed in through the vapor emission inlets 104' and then radially across the hydrocarbon filter 56, upon which filtered air exits the air openings.

Referring now to FIG. 7, a side view of another passive evaporative emission control module 14" prior to attachment to a fuel tank 16' and in accordance with another embodiment of the present invention is shown. As shown, the outlet half 64' of the control module body 50' is inserted through a fuel tank designated opening 150. The outlet half 64' has a weld ring 152, which is used to provide additional material during welding of the module 14" to the fuel tank 16'. The weld ring 152 may be integrally formed as part of the module 14" or may be a separate component and slid over the outlet half 64'. After insertion of the outlet half 64', the weld ring 152 is disposed between the base 54" of the control module 14" and the exterior surface 154 of the fuel tank 16' adjacent the designated opening 150. The weld ring 152 may be formed of various materials and serve one or more purposes. The weld ring 152 may perform as a catalyst and aid in the welding of the base 54" to the fuel tank 16' or may perform as a bonding material to attach the base 54" to the fuel tank 16'. The weld ring 152 may also be attached to or formed as part of the base 54" and welded onto the fuel tank 16' or may be attached to or formed as part of the fuel tank 16' and be welded to the base 54". The fuel tank 16', the weld ring 152, and/or the base 54" may be hermetically welded, hot plate welded, or welded using some other known technique.

Referring now to FIG. 8, a side view of another passive evaporative emission control module 14'" attached to fuel tank assembly 160 and in accordance with another embodiment of the present invention is shown. The fuel tank assembly 160 has a fuel neck 162 that is integrally formed as part of a fuel tank 164. The control module 14'" is similar to the control module 14. The base 54'" of the control module 14'" is attached to, as shown, or integrally formed as part of the exterior wall 166 of the fuel tank 164 via the fuel neck 162. The base 54'" may be welded, fastened, molded, sealed, and/or adhered to the fuel neck 162.

Referring now to FIG. 9, a side view of another passive evaporative emission control module 170 incorporated as part of a fuel neck 172 of a fuel tank 174 and in accordance with another embodiment of the present invention is shown. The fuel neck 172 has a first neck portion 176, which is integrally formed as part of the fuel tank 174, and a second neck portion 178. The first neck portion 176 has a first module end 180. The second neck portion 178 has a second module end 182 and a fuel cap end 184. The control module 170 includes a body 186 and a housing 188. The body 186, like the body 50, is a pass through coupling that has an inlet half 190 and an outlet half 192. The first module end 180 is attached to the housing 188 and the outlet half 192. The second module end 182 is slid over and is attached to the inlet half 190. The fuel cap end 184 is configured to receive a fuel cap 194. The embodiment of FIG. 9 allows for the integration of a passive control module to be placed anywhere along a fuel neck.

Figure 10:
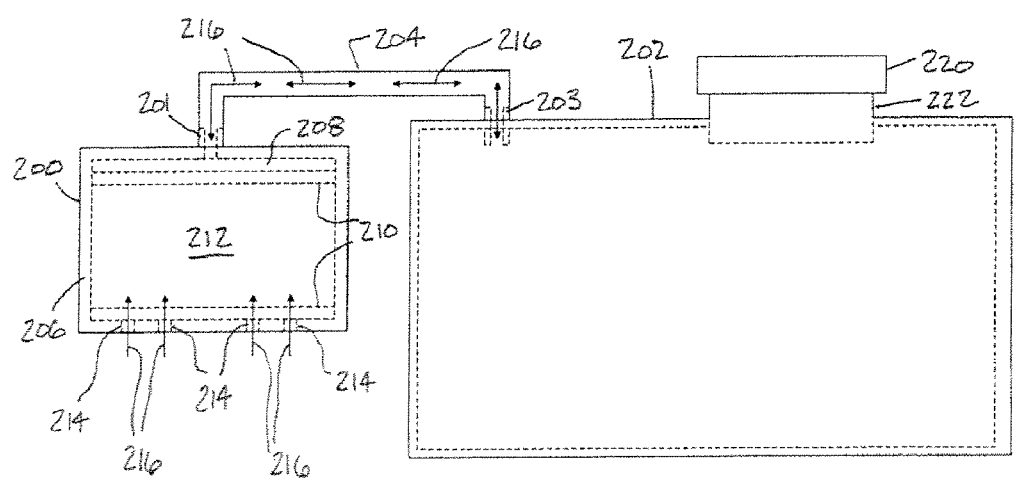
FIG. 10 is a side view of another passive evaporative emission control module remotely located from a fuel tank in accordance with still another embodiment of the present invention.

Referring now to FIG. 10, a side view of another passive evaporative emission control module 200 remotely located from a fuel tank 202 and in accordance with another embodiment of the present invention is shown. The control module 200 is fluidically coupled to the fuel tank 202 via an evaporative emissions line 204. The emissions line is coupled to a first emission line attachment coupling 201 of the control module 200 and to a second emission line attachment coupling 203 of the fuel tank 202. The control module 200 includes an outer housing 206 in which a fuel splash absorber 208 and a pair of retaining elements 210 are disposed. A hydrocarbon filter 212 is disposed between the retaining elements. The fuel splash absorber 208, the retaining elements 210, and the hydrocarbon filter 212 are is similar to the fuel splash absorber 120, the retaining elements 110, and the hydrocarbon filter 56. The housing has air inlets 214. The flow of vapors and air is shown by arrows 216.

The fuel tank has a fuel cap 220, which is attached to a fuel neck 222. Note that although the emissions line 204 is attached to the fuel tank, it may alternatively or also be attached to the fuel neck 222.

The present invention provides passive evaporative emission control modules that may be utilized anywhere on a fuel tank or fuel neck. The passive control modules provide for the capturing of hydrocarbons and the purging of that capture without systematically induced purging mechanisms. The capturing and purging processes are performed through the normal evaporation of fuel within a fuel tank and the normal supply of fuel to an engine.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An emission control module coupled to a fuel reservoir, the emission control module having a fuel inlet and a fuel outlet defining a center fuel flow axis therewithin, the fuel reservoir having a vapor region having a quantity of fuel vapor extending above a quantity of fuel, the emission control module comprising:
   a housing comprising;
   at least one atmospheric air opening;
   a base including at least one vapor emission inlet for communication with the vapor region of the fuel reservoir; and
   a hydrocarbon filter disposed between said at least one atmospheric air opening and said at least one vapor emission inlet to passively filter vapor emissions from the vapor region;
   said housing configured for purging the quantity of fuel vapor from said hydrocarbon filter due to a low pressure draw from said at least one vapor emission inlet;
   wherein said housing comprises a non-linear hydrocarbon filter purge path for air and the quantity of fuel vapor to flow from said at least one atmospheric air opening, across said hydrocarbon filter, and through said at least one vapor emission inlet;
   wherein said non-linear hydrocarbon filter purge path flows in a direction through said hydrocarbon filter that is not parallel to the center fuel flow axis along a majority of its length from said at least one atmospheric air opening to said at least one vapor emission inlet.

2. A module as in claim 1 wherein said housing comprises:
   an annular-shaped channel; and
   an annular cover enclosing said channel and comprising said at least one atmospheric air opening.

3. A module as in claim 1 wherein said at least one atmospheric air opening is not in communication with or coupled to an intake manifold.

4. A module as in claim 1 wherein said housing is integrally formed as part of said fuel reservoir.

5. A module as in claim 1 wherein said housing is integrally formed as part of a fuel reservoir neck.

6. A module as in claim 1 wherein said at least one atmospheric air opening is out of alignment with said at least one vapor emission inlet.

7. A module as in claim 1 further comprising a plurality of retaining elements retaining material of said hydrocarbon filter in said housing.

8. A module as in claim 1 further comprising at least one fuel-absorbing element coupled within said housing.

9. An emission control module comprising:
   a body comprising;
   a fuel inlet; and
   a fuel outlet;
   a center flow fuel axis defined along the length of said body between said fuel inlet and said fuel outlet;
   a housing coaxially coupled to said body and comprising;
   at least one atmospheric air opening; and
   at least one vapor emission inlet for communication with a vapor region of a fuel reservoir, said vapor region having a quantity of fuel vapor contained therewithin; and
   a hydrocarbon filter disposed between said at least one atmospheric air opening and said at least one vapor emission inlet to passively filter vapor emissions within said vapor region;
   wherein said housing comprises a hydrocarbon filter purge path for air and the fuel vapor to flow from said at least one atmospheric air opening, across said hydrocarbon filter, substantially along a plane that is not parallel to said center fuel flow axis, and through said at least one vapor emission inlet.

10. A module as in claim 9 wherein said body is configured for reception of a fuel cap.

11. A module as in claim 10 wherein said body is configured such that said cap when fully fastened on said body is a separation distance away from the exterior surface of said housing to allow air to enter said at least one atmospheric air opening.

12. A module as in claim 11 wherein said at least one atmospheric air opening is out of alignment with said at least one vapor emission inlet.

13. A fuel reservoir assembly comprising:
   a fuel reservoir having a quantity of fuel and a quantity of fuel vapor, said fuel reservoir comprising:
   an enclosure with an exterior wall; and
   an internal holding volume with a vapor region having said quantity of fuel vapor;
   a body comprising;
   a fuel inlet; and
   a fuel outlet in communication with said internal holding volume;
   a center fuel flow axis defined along the length of said body from said fuel inlet to said fuel outlet,
   a housing coupled to said exterior wall and coaxially coupled to said body and comprising;
   at least one atmospheric air opening; and
   at least one vapor emission inlet for communication with said vapor region; and
   a hydrocarbon filter disposed between said at least one atmospheric air opening and said at least one vapor emission inlet and passively filtering said quantity of fuel vapor within said vapor region, said hydrocarbon filter being purged due to draw of fuel from said reservoir;
   wherein said housing comprises a hydrocarbon filter purge path for air and said quantity of fuel vapor to flow from said at least one atmospheric air opening, across said hydrocarbon filter, substantially along a plane that is not parallel to a center fuel flow axis, and through said at least one vapor emission inlet.

14. An assembly as in claim 13 further comprising a fuel neck coupled to said fuel reservoir, said housing coupled to said exterior wall via said fuel neck.

15. An assembly as in claim 13 further comprising a fuel cap, said body configured for reception of said fuel cap.

16. An assembly as in claim 13 wherein said housing is coupled to said exterior wall via at least one technique selected from welding, fastening, molding, sealing, and adhering.

17. An assembly as in claim 13 wherein said housing is integrally formed as a single unit with said fuel reservoir.

* * * * *